United States Patent
Jo et al.

(10) Patent No.: US 10,309,444 B2
(45) Date of Patent: Jun. 4, 2019

(54) PARKING CABLE FOR VEHICLE AND METHOD OF MANUFACTURING THE SAME

(71) Applicants: HYUNDAI MOTOR COMPANY, Seoul (KR); KYUNG CHANG INDUSTRIAL CORPORATION, Daegu (KR)

(72) Inventors: Young Jin Jo, Hwaseong-si (KR); Jung Woo Woo, Daegu (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 12 days.

(21) Appl. No.: 15/487,060

(22) Filed: Apr. 13, 2017

(65) Prior Publication Data

US 2018/0135690 A1    May 17, 2018

(30) Foreign Application Priority Data

Nov. 11, 2016 (KR) .......................... 10-2016-0150119

(51) Int. Cl.
 *F16C 1/10* (2006.01)
 *F16C 1/20* (2006.01)
 *B60T 11/04* (2006.01)
 *F16C 1/26* (2006.01)

(52) U.S. Cl.
 CPC ............ *F16C 1/262* (2013.01); *B60T 11/046* (2013.01); *F16C 1/106* (2013.01); *F16C 1/107* (2013.01); *F16C 1/267* (2013.01)

(58) Field of Classification Search
 CPC .. F16C 1/10; F16C 1/106; F16C 1/107; F16C 1/12; F16C 1/14; F16C 1/26; F16C 1/262; F16C 1/267; B60T 11/046
 See application file for complete search history.

(56) References Cited

U.S. PATENT DOCUMENTS

| | | | | |
|---|---|---|---|---|
| 1,481,078 A | * | 1/1924 | Albertson | ................. F16C 1/06 464/174 |
| 2,210,733 A | * | 8/1940 | Schmid | .................. B23D 51/16 15/22.2 |
| 2,691,900 A | * | 10/1954 | Brickman | ............. B60T 11/046 138/131 |
| 2,858,708 A | * | 11/1958 | Brickman | ............... F16C 1/107 277/625 |

(Continued)

FOREIGN PATENT DOCUMENTS

| | | | | |
|---|---|---|---|---|
| DE | 3021533 A1 | * | 12/1981 | ................ F16C 1/26 |
| EP | 3115629 A1 | * | 1/2017 | ................ F16C 1/26 |

(Continued)

*Primary Examiner* — Adam D Rogers
(74) *Attorney, Agent, or Firm* — Lempia Summerfield Katz LLC (57) ABSTRACT

A parking cable has a plurality of plastic split type liners, which reduces frictional resistance between the inner cable and a conduit among the components of the parking cable. The plurality of split type liners is press-fitted and disposed to a desired position in an inner diameter of the conduit. The plastic split type liners may serve as a guide that ensures force for smoothly moving the inner cable and also improve in-line assembly properties. A method of manufacturing the parking cable includes press fitting the plurality of split type liners between the inner cable and the conduit.

12 Claims, 5 Drawing Sheets

(56) References Cited

U.S. PATENT DOCUMENTS

| | | | | |
|---|---|---|---|---|
| 3,190,084 | A | * | 6/1965 | Moon ........................ F16C 1/06 |
| | | | | 138/131 |
| 4,424,045 | A | * | 1/1984 | Kulischenko ............. F16C 1/26 |
| | | | | 464/170 |
| 5,003,837 | A | * | 4/1991 | Italiano ................... F16C 1/226 |
| | | | | 403/165 |
| 5,003,838 | A | * | 4/1991 | Pospisil ................. F16C 1/107 |
| | | | | 74/502.4 |
| 5,785,152 | A | * | 7/1998 | Fujita ........................ F16C 1/24 |
| | | | | 184/15.1 |
| 2007/0078012 | A1 | * | 4/2007 | Rosu ........................ F16C 1/06 |
| | | | | 464/52 |

FOREIGN PATENT DOCUMENTS

| | | | | |
|---|---|---|---|---|
| GB | 453105 | A * | 9/1936 | ................ F16C 1/06 |
| JP | 63219908 | A * | 9/1988 | ................ F16C 1/26 |
| JP | 2006322559 | A * | 11/2006 | ................ F16C 1/20 |
| WO | WO-2012060265 | A1 * | 5/2012 | .............. F16C 1/103 |

\* cited by examiner

FIG. 1

Prior Art

FIG. 2

Prior Art

Prior Art

PARKING CABLE FOR VEHICLE AND METHOD OF MANUFACTURING THE SAME

CROSS-REFERENCE TO RELATED APPLICATION

This application claims under 35 U.S.C. § 119(a) the benefit of priority to Korean Patent Application No. 10-2016-0150119 filed on Nov. 11, 2016, the entire contents of which are incorporated herein by reference.

BACKGROUND

(a) Technical Field

The present disclosure relates to a parking cable for a vehicle and a method of manufacturing same.

(b) Background Art

In general, a parking brake for a vehicle is a kind of a safety device which restricts and brakes a vehicle wheel when the vehicle is parked. Such a parking brake is useful particularly when the vehicle is parked or stopped on an inclined road surface, thereby preventing the vehicle from slipping or rolling unintentionally.

There is a manual parking brake, which is operated as a driver pulls or releases a parking lever or parking brake lever. There is also an electronic parking brake, which is operated as a driver manipulates a button. The manual parking brake and the electronic parking brake each include a parking brake cable, i.e., a parking cable in common.

Figure 1:
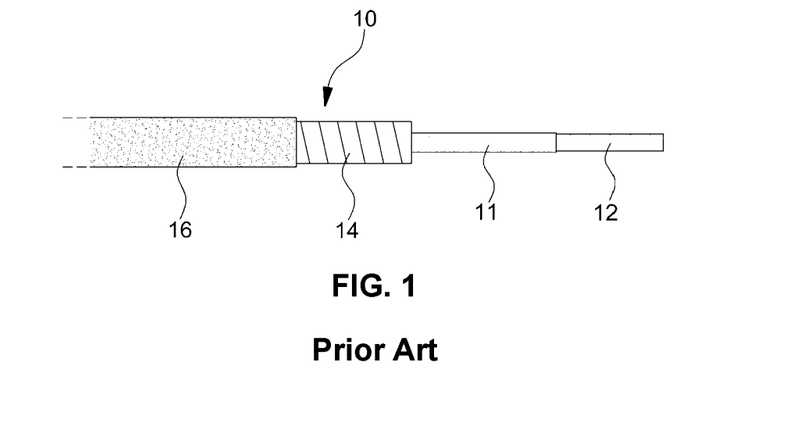
FIG. 1 is a cross-sectional view illustrating a parking cable in the related art.

As illustrated in FIG. 1, a parking cable 10 in the related art includes an inner cable 12, which has a coating layer 11, a conduit 14, which is manufactured in a tube shape by winding a metallic wire, and a protective outer coating layer 16 coated on an outer diameter of the conduit 14. The parking cable 10 has a structure in which the inner cable 12 is movably inserted and disposed in an inner diameter portion of the conduit 14.

Figure 4:
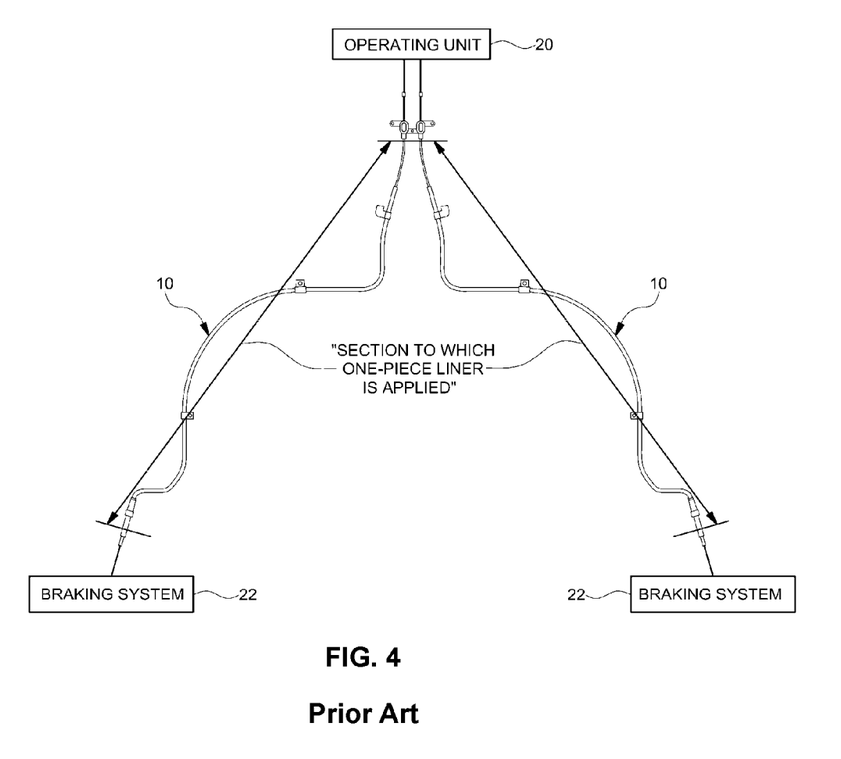
FIG. 4 is a view illustrating a state in which the parking cable of FIGS. 2 and 3 with the embedded one-piece liner is installed and mounted in a vehicle body.

As illustrated in FIG. 4, the parking cable 10 is connected between an operating unit 20, such as a parking lever, and a brake system 22 for restricting the vehicle wheel.

Therefore, a parking braking operation of the brake system 22 is carried out as follows. The inner cable 12 in the parking cable 10 is pulled by pulling the operating unit 20. Because configurations and operations of the operating unit 20 and the brake system 22 are publicly known technologies, specific descriptions thereof will be omitted herein.

However, in the case of the parking cable 10 in the related art, both of the inner cable 12 and the conduit 14 are made of a metallic material. Thus, metal-to-metal friction occurs when the inner cable 12 is moved in the inner diameter portion of the conduit 14. As a result, there is a problem in that operational efficiency and durability of the parking cable deteriorate due to high frictional resistance.

Therefore, more recently, a separate liner, which reduces frictional resistance and guides a smooth movement of the inner cable, is inserted between the inner cable and the conduit of the parking cable.

The above information disclosed in this Background section is only for enhancing the understanding of the background of the disclosure. Therefore, the Background section may contain information that does not form the prior art that is already known in this country to a person of ordinary skill in the art.

SUMMARY OF THE DISCLOSURE

The presently disclosed parking cable embodiments have been made in an effort to solve the above-described problems associated with the prior art. A parking cable for a vehicle is provided and has a new structure. The structure includes a plurality of plastic split type liners, which reduces frictional resistance between an inner cable and a conduit. The plurality of plastic liners is press-fitted and disposed to a desired position in an inner diameter portion of the conduit. As a result, the plastic split type liners may serve as a guide that ensures force for smoothly moving the inner cable and improve in-line assembly properties. A method of manufacturing the parking cable.

In one aspect, the present disclosure provides a parking cable for a vehicle. The parking cable includes: a conduit, which has a tube shape; a protective outer coating layer coated on an outer diameter of the conduit; a plurality of split type liners, which is press-fitted into an inner diameter of the conduit; and an inner cable, which is movably inserted into the respective split type liners. The plurality of split type liners is press-fitted and disposed at positions that deviate from an in-line assembly section and a curved section in the entire length section of the conduit. The plurality of split type liners includes first split type liners, which are press-fitted into an inner diameter portion of the conduit, and second split type liners, which are press-fitted into both end portions of the conduit after the first split type liners are press-fitted into the inner diameter portion of the conduit.

In an embodiment, a fine protrusion may be integrally formed on an outer diameter portion of a first split type liner press-fitted into the conduit, and locked by coming into close contact with an inner diameter surface of the conduit.

In another embodiment, locking ends may be formed by expanding outer end portions of the second split type liners press-fitted into both end portions of the conduit, and locked by coming into close contact with an outer surface of the conduit.

In still another embodiment, cap casings for connecting the parking cable to an operating unit and a brake system may be assembled, by swaging, to outer diameter portions at both ends of the conduit coated with the protective outer coating layer.

In yet another embodiment, when the cap casing is swaged, a locking end formed at an outer end portion of the second split type liner may be fixed by receiving force for pressing the cap casing by swaging and compressing force of a seal present in the cap casing.

In another aspect, the present disclosure provides a method of manufacturing a parking cable for a vehicle. The method includes: i) manufacturing a conduit having a predetermined diameter by winding a metallic wire in a cylindrical shape; ii) coating an outer diameter of the conduit with a protective outer coating layer; iii) cutting the conduit coated with the protective outer coating layer to a desired predetermined length by using a cutting means; iv) press-fitting a plurality of split type liners into an inner diameter portion of the conduit at positions that deviate from an in-line assembly section and a curved section in the entire length section of the conduit; and v) assembling cap casings for connecting the parking cable to an operating unit and a brake system, by swaging, to outer diameter portions at both ends of the conduit coated with the protective outer coating layer.

In an embodiment, in step iv), the plurality of split type liners may include first split type liners and second split type liners. The plurality of split type liners may be press-fitted and disposed at positions that deviate from the in-line assembly section and the curved section in the entire length section of the conduit. The second split type liners may be press-fitted into both end portions of the conduit after the first split type liners of the plurality of split type liners are pressed into the inner diameter portion of the conduit first.

In another embodiment, when a first split type liner is press-fitted into the inner diameter portion of the conduit, a fine protrusion formed on an outer diameter portion of the first split type liner may be locked by coming into close contact with an inner diameter surface of the conduit.

In still another embodiment, when the second split type liners are press-fitted into both end portions of the conduit, a locking end formed on an outer end portion of the second split type liner may be locked by coming into close contact with an outer surface of the conduit.

In yet another embodiment, when the cap casing is swaged in step v), a locking end formed on an outer end portion of the second split type liner may be fixed by receiving force for pressing the cap casing by swaging and compressing force of a seal present in the cap casing.

Through the aforementioned technical solutions, the present disclosure provides the effects below.

First, since the plurality of split type liners including the first and second split type liners are press-fitted and disposed at the positions that deviate from the in-line assembly section and the curved section in the entire length section of the parking cable, no liner is embedded in assembly and curved sections of the parking cable. As a result, it is possible to eliminate force by which the parking cable returns back to the original position by elastic restoring force of the liner in the assembly and curved section of the parking cable.

Second, since the force by which the parking cable returns back to the original position by elastic restoring force of the liner in the assembly and curved sections of the parking cable is eliminated, the operator may handle the operation of assembling the parking cable to the vehicle body in a desired manner. As a result, the operator may perform the operation of assembling the assembly and curved portion of the parking cable to the vehicle body in a very comfortable position, thereby greatly improving assembly workability of the operator who assembles the parking cable to the vehicle body.

Third, even in a case in which the split type liners are embedded in the positions that deviate from the in-line assembly section and the curved section instead of the entire length section of the parking cable, the split type liners may easily serve as a guide, which provides force for smoothly moving the inner cable when a parking brake is operated.

Other aspects and embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuel derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain embodiments thereof illustrated in the accompanying drawings, which are given hereinbelow by way of illustration only, and thus are not intended to limit the present disclosure, and wherein.

It should be understood that the appended drawings are not necessarily to scale and thus may present a somewhat simplified representation of various preferred features illustrative of the basic principles of the disclosure. The specific design features of the present disclosure as described herein, including, for example, specific dimensions, orientations, locations, and shapes, will be determined in part by the particular intended application and use environment.

In the figures, like reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with various embodiments, it will be understood that the present description is not intended to limit the disclosure to those embodiments. On the contrary, the disclosure is intended to cover not only the disclosed embodiments, but also various alternatives, modifications, equivalents and other embodiments, which may be included within the spirit and scope of the disclosure as defined by the appended claims.

Hereinafter, embodiments of the present disclosure will be described in detail with reference to the accompanying drawings.

First, to help understand the present disclosure, the following description will be made with regard to a structure in which a liner is inserted over an entire length section of a parking cable.

Figure 2:
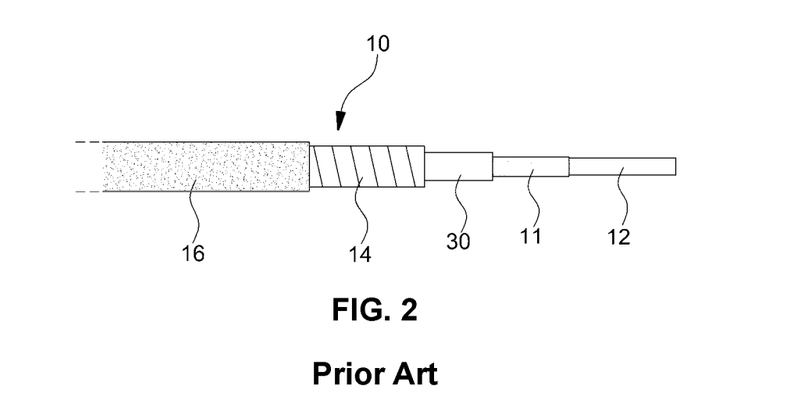
FIG. 2 is a cross-sectional view illustrating a part of a parking cable with an embedded one-piece liner.
Figure 3:
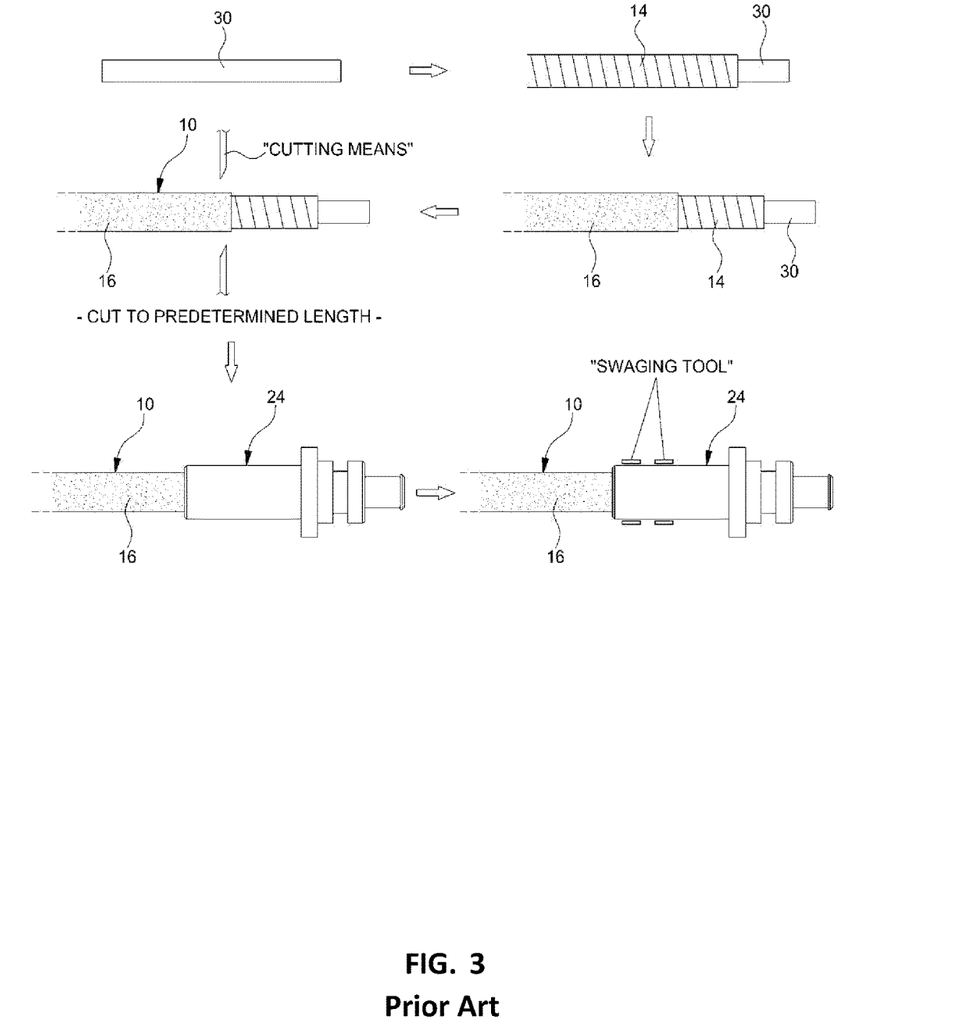
FIG. 3 is a partially enlarged cross-sectional view illustrating a method of manufacturing the parking cable with the embedded one-piece liner.

FIG. 2 is a cross-sectional view illustrating a part of a parking cable in which a one-piece liner is embedded over an entire length section. FIG. 3 is a partially enlarged view illustrating a method of manufacturing the parking cable in which the liner is embedded over the entire length section.

As illustrated in FIG. 2, a parking cable 10 has a liner. The parking cable 10 includes an inner cable 12, which has a coating layer 11, a one-piece liner 30, which has a tubular structure into which the inner cable 12 is movably inserted, a conduit 14, which is manufactured in a tube shape by winding a metallic wire, and a protective outer coating layer 16 with which an outer diameter of the conduit 14 is coated.

In this embodiment, the one-piece liner 30 is inserted between an outer diameter of the inner cable 12 and an inner diameter of the conduit 14 over an entire length section of the parking cable 10. The entire length section includes a length connected between an operating unit and a brake system of a vehicle.

As illustrated in FIG. 3, a process of manufacturing the parking cable 10 having the one-piece liner 30 includes a step of inserting the inner cable 12 into the one-piece liner 30. The process also includes a step of winding the conduit 14 around an outer diameter of the liner 30. The process also includes a step of coating the outer diameter of the conduit 14 with the protective outer coating layer 16. The parking cable 10 is cut to a predetermined length by using a cutting means. Finally, cap casings 24 are assembled, such as by swaging, to both end portions of the parking cable 10 and which are connected to the operating unit 20 and the brake system 22, respectively.

Therefore, the process of assembling the parking cable 10 is completed by connecting the cap casing 24 with the operating unit 20 such as a parking lever and the brake system 22 for restricting a vehicle wheel, and by assembling several portions of the parking cable 10, which are disposed between the cap casings 24, to a vehicle body.

Therefore, the parking brake operation of the brake system 22 is carried out as the inner cable 12 in the parking cable 10 is pulled by pulling the operating unit 20. In this embodiment, the inner cable 12 is moved in the inner diameter of the one-piece liner 30 made of a plastic material instead of being moved in the conduit 14.

In this embodiment, frictional resistance between the metallic inner cable 12 and the plastic one-piece liner 30 is greatly reduced in comparison with the existing metal-to-metal frictional resistance between the metallic inner cable 12 and the metallic conduit 14. The one-piece liner 30 serves as a guide for guiding a movement of the inner cable 12. As a result, it is possible to ensure operating force for smoothly pulling the inner cable 12, and thus to improve operational efficiency and durability of the parking cable.

FIG. 4 illustrates a state in which the parking cable 10, in which the one-piece liner 30 is embedded over the entire length section, is installed between the operating unit 20 and the brake system 22. The parking cable 10 is installed and mounted in a state in which several portions of the parking cable 10 are curved in accordance with a structure of the vehicle body. More particularly, several portions of the parking cable 10 are curved in an in-line assembling section in which several portions of the parking cable 10 are mounted to the vehicle body in the entire length section of the parking cable 10, or the several portions of the parking cable 10 are curved to correspond to a complicated shape of the vehicle body.

In this embodiment, when an operator assembles the parking cable 10 to the vehicle body in a state in which the parking cable 10 is curved in the in-line section, the one-piece liner 13 is also curved in a curved portion of the parking cable 10 so as to have elastic restoring force.

In other words, since the one-piece liner 13 is made of a plastic material and has a tube shape, the one-piece liner 13 has its own elastic restoring force when the one-piece liner 13 is curved.

Therefore, the curved portion of the parking cable 10 returns back to the original position (a position before the parking cable 10 is curved) by the elastic restoring force of the one-piece liner 13. As a result, there is a problem in that workability deteriorates when the operator assembles the parking cable to the vehicle body.

For example, the operator needs to assemble the parking cable 10 to the vehicle body in a state in which the operator holds a tool by using one hand and holds the curved portion of the parking cable 10 by using the other hand so as to prevent the parking cable 10 from returning back to the original position. As a result, there is a drawback in that assembly workability of the operator deteriorates.

Because the parking cable 10 returns back to the original position (the position before the parking cable 10 is curved) from the curved position by the elastic restoring force of the one-piece liner 30, there is a drawback or resulting disadvantage. Assembly workability of the operator deteriorates because it is very difficult for the operator to insert the curved parking cable into a mounting hole of a bracket 26 formed on the vehicle body.

To solve the aforementioned drawbacks, according to the present disclosure, a plurality of split type liners for reducing frictional resistance is press-fitted and disposed between the outer diameter of the inner cable and the inner diameter of the conduit. The plurality of split type liners is press-fitted and disposed at positions that deviate from the in-line assembly section and the curved section of the entire length section of the parking cable (i.e., an entire length section of the conduit), thereby providing a force for smoothly moving the inner cable and improving in-line assembly workability.

Figure 5:
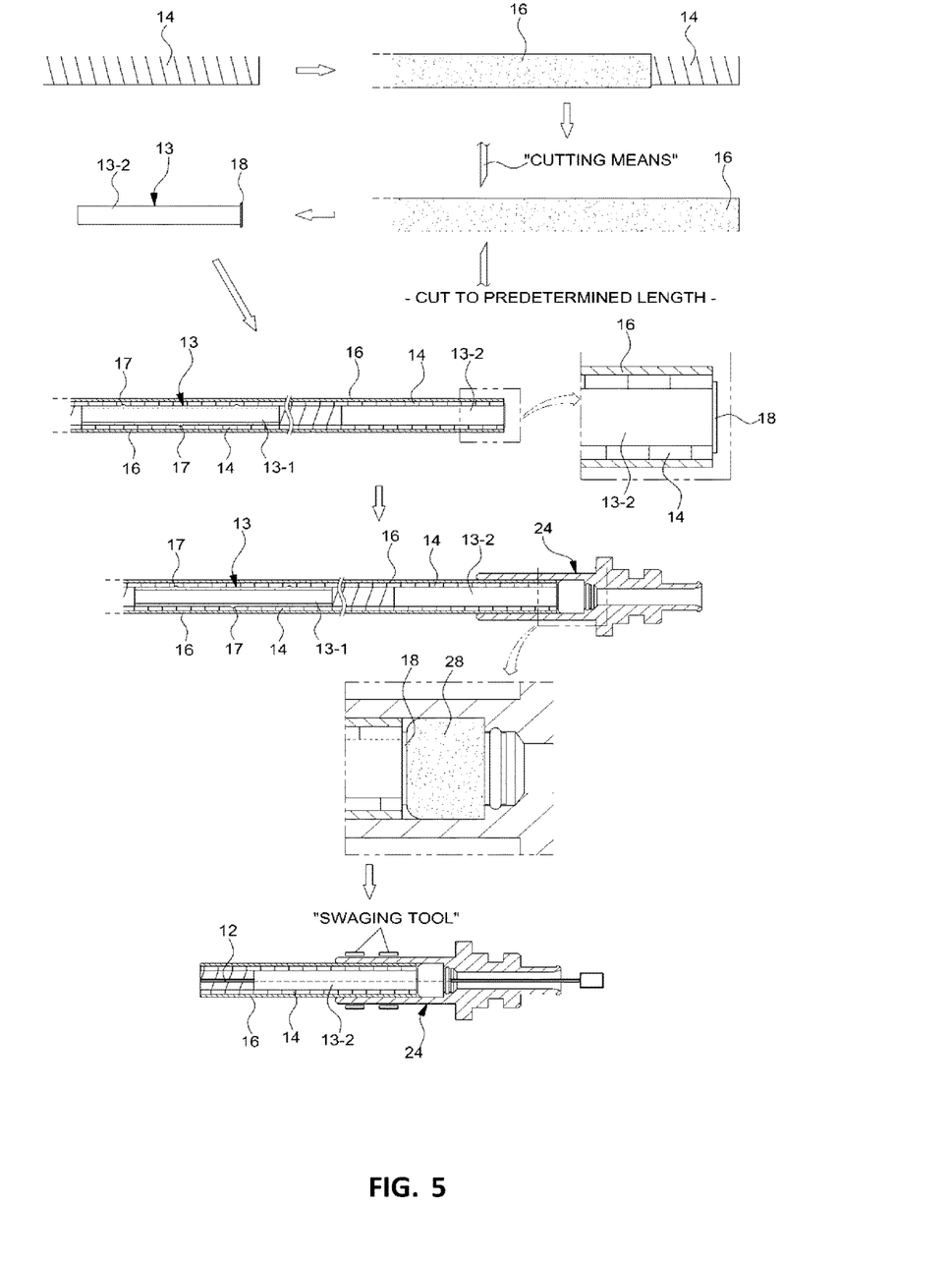
FIG. 5 is a partially enlarged cross-sectional view illustrating a parking cable and a method for manufacturing the same according to the present disclosure.
Figure 6:
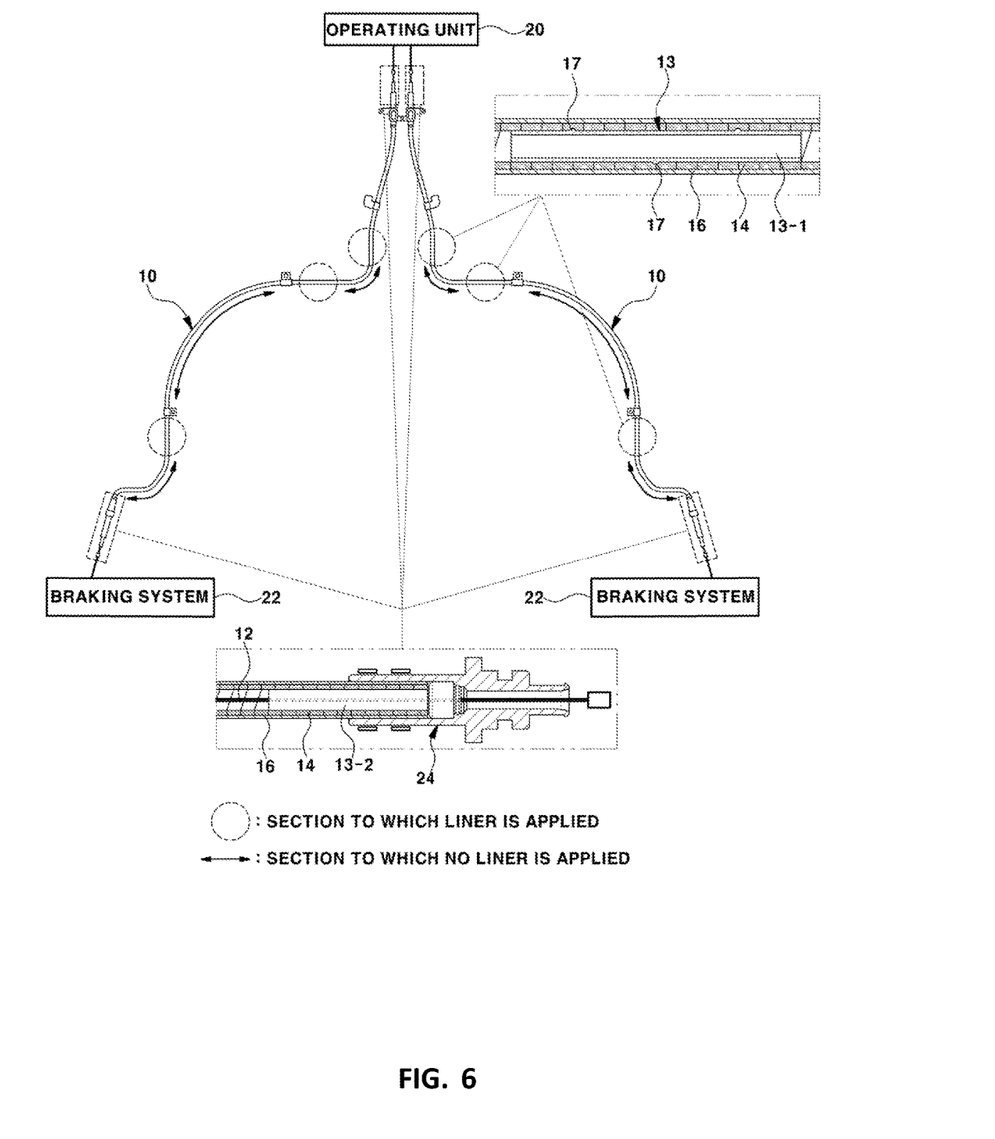
FIG. 6 is a view illustrating a state in which the parking cable of FIG. 5 according to the present disclosure is installed and mounted in the vehicle body.

FIG. 5 is a cross-sectional view illustrating a parking cable for a vehicle and a method of manufacturing the same according to the present disclosure. FIG. 6 is a view illustrating a state in which the parking cable of FIG. 5 according to the present disclosure is installed between the operating unit and the brake system, and illustrating a section in which liners are partially inserted in the entire length section of the parking cable.

The parking cable 10 according to the present disclosure includes an inner cable 12, which has a coating layer 11, a plurality of split type liners 13 into which the inner cable 12 is movably inserted, a conduit 14, which is manufactured in a tube shape by winding a metallic wire, and a protective outer coating layer 16 with which an outer diameter of the conduit 14 is coated. In this embodiment, the parking cable is given the same reference number 10 as in the earlier discussion of the existing parking cable because each is a parking cable. The differences lie in the inner structures of the parking cables. Further, the term split type liner means a liner segment of a length less than an entire length of the parking cable or conduit.

In this case, the split type liners 13 are press-fitted and fixed in an inner diameter of the conduit 14 only at desired positions over an entire length section of the parking cable 10. The entire length section is a length connected between the operating unit and the brake system of the vehicle.

To this end, first, the hollow conduit 14 having a predetermined diameter is manufactured by winding a flat metallic wire to form a cylindrical structure.

Next, the outer diameter of the conduit 14 is coated with the protective outer coating layer 16.

Next, a cutting step of cutting the conduit 14, which has been coated with the protective outer coating layer 16, to a desired predetermined length. The desired length is a length that connects the operating unit and the brake system. The conduit 14 is cut to the desired length by using a cutting means.

Next, the plurality of split type liners 13 is press-fitted into the inner diameter portion of the conduit 14. The plurality of split type liners 13 is press-fitted at the desired positions in the entire length section of the conduit 14. As a result, the split type liners 13 are disposed at the desired positions so as to be spaced apart from each other.

The plurality of split type liners 13 includes first split type liners 13-1, which are completely press-fitted into the inner diameter portion of the conduit, and the plurality of split type liners 13 also includes second split type liners 13-2, which are press-fitted into both end portions of the conduit 14 after the first split type liners 13-1 are press-fitted into the inner diameter portion of the conduit 14.

Therefore, unlike the existing parking cable 10 having a structure in which the one-piece liner 13 is inserted and disposed over the entire length section, in the present disclosure, the plurality of split type liners 13 is press-fitted into the inner diameter portion of the conduit 14, such that the split type liners 13 are press-fitted and disposed only at the desired positions in the entire length section of the parking cable 10 (i.e., the entire length section of the conduit 14).

In other words, when the plurality of split type liners 13 is press-fitted into the inner diameter portion of the conduit 14, the split type liners 13 are press-fitted and disposed at the positions that deviate from the in-line assembly section and the curved section in the entire length section of the parking cable. Again, the entire length section of the parking cable 10 is a length connected between the operating unit and the brake system of the vehicle, as illustrated in FIG. 6.

In this embodiment, as illustrated in FIG. 6, fine protrusions 17 are integrally formed on an outer diameter portion of the first split type liner 13-1 press-fitted into the conduit 14. The fine protrusion 17 serves as a locking structure, which is locked by coming into close contact with an inner diameter surface of the conduit 14. As a result, the first split type liner 13-1 may remain securely fixed at the desired position, which is a position that deviates from the in-line assembly section and the curved section.

Referring to FIG. 5, cap casings 24 are assembled, such as by swaging, to both end portions of the parking cable 10. Both end portions of the parking cable 10 are connected with the operating unit 20 and the brake system 22, respectively.

Because inner sections adjacent to both end portions of the parking cable 10 are also curved to connect to the operating unit 20 and the brake system 22, no separate liner is embedded in the inner sections adjacent to both end portions of the parking cable 10. The second split type liners 13-2 are press-fitted into both end portions of the parking cable 10 so as to straightly guide the inner cable.

In this embodiment, in a state in which several first split type liners 13-1 are already press-fitted in the in-line assembly section and the curved section in the entire section of the parking cable 10, the second split type liners 13-2 are subsequently press-fitted into both end portions of the parking cable 10.

The second split type liners 13-2, which are press-fitted into both end portions of the parking cable 10, that is, both end portions of the conduit 14, may be withdrawn out of place while moving in a longitudinal direction of the parking cable 10. Therefore, locking ends 18, which are locked by coming into close contact with an outer surface of the conduit 14, are formed on an outer portion of the second split type liner 13-2. The locking ends 18 are formed by expanding the outer portion of the second split type liner 13-2 before the cap casings 24 are swaged, as illustrated in FIG. 5.

Therefore, the second split type liners 13-2 are press-fitted into the inner diameter portions at both ends of the conduit 14. At the same time, the locking ends 18 of the second split type liners 13-2 are caught by the outer surfaces of the conduit 14. The cap casings 24 for connecting the parking cable to the operating unit 20 and the brake system 22 are then assembled, such as by swaging, to the outer diameter portions at both ends of the conduit 14, which has been coated with the protective outer coating layer 16, as illustrated in FIG. 5.

In this embodiment, the locking end 18 of the second split type liner 13-2 simultaneously receives both a force for pressing the cap casing 24 by swaging and a compressing force of a seal 28 present in the cap casing 24. As a result, it is possible to securely maintain the state in which the locking end 18 is locked and in close contact with the outer surface of the conduit 14, which prevents the withdrawal of the second, split type liner 13-2.

Therefore, since the split type liners 13, including the first and second split type liners 13-1 and 13-2, are press-fitted, disposed, and securely fixed at the positions that deviate from the in-line assembly section and the curved section in the entire length section of the parking cable 10, no liner is disposed in the assembly at curved sections of the parking cable 10 when the operator assembles the parking cable 10 to the vehicle body in the in-line section. As a result, it is possible to eliminate force by which the parking cable 10 returns back to the original position by elastic restoring force of the liner.

Therefore, in a state in which the force by which the parking cable 10 returns back to the original position by elastic restoring force of the liner is eliminated, the operator may handle the operation of assembling the parking cable to the vehicle body in a desired manner. As a result, the operator may perform the operation of assembling the assembly and curved portions of the parking cable 10 to the vehicle body (e.g., an operation of inserting the parking cable into the mounting hole of the bracket 26 formed on the vehicle body) in a very comfortable position, thereby greatly improving assembly workability of the operator who assembles the parking cable to the vehicle body.

Of course, even in a case in which the split type liners 13 are embedded only in the positions that deviate from the in-line assembly section and the curved section instead of the entire length section of the parking cable 10, the split type liners 13 may easily serve as a guide, which provides force for smoothly moving the inner cable 12 when a parking brake is operated. As a result, it is possible to ensure operational efficiency and durability of the parking cable.

The disclosure has been described in detail with reference to various embodiments thereof. However, it will be appreciated by those skilled in the art that changes may be made in these embodiments without departing from the principles and spirit of the disclosure, the scope of which is defined in the appended claims and their equivalents.

What is claimed is:

1. A parking cable for a vehicle, the parking cable comprising:
    a conduit, which has a tube shape;
    a protective outer coating layer, an outer diameter of the conduit being coated with the protective outer coating layer;
    a plurality of split type liners, which are press-fitted into an inner diameter of the conduit; and an inner cable, which is movably inserted into the respective split type liners, wherein the plurality of split type liners are press-fitted and disposed at the inner diameter of the conduit that deviate from an in-line assembly section and a curved section in an entire length section of the conduit, and wherein the plurality of split type liners include one or more first split type liners press-fitted into an inner diameter portion of the conduit, and second split type liners press-fitted into both end portions of the conduit after the first split type liners are press-fitted into the inner diameter portion of the conduit.

2. The parking cable of claim 1, wherein a protrusion is integrally formed on an outer diameter portion of the one or more first split type liners press-fitted into the conduit, and wherein the protrusion is locked by coming into contact with an inner diameter surface of the conduit.

3. The parking cable of claim 1, wherein locking ends are formed by expanding outer end portions of the second split type liners press-fitted into the both end portions of the conduit, and wherein each locking end is locked by coming into contact with an outer surface of the conduit.

4. The parking cable of claim 1, wherein cap casings for connecting the parking cable to an operating unit and a brake system are assembled to outer diameter portions at the both end portions of the conduit.

5. The parking cable of claim 4, wherein the cap casings are swaged to the outer diameter portions at the both end portions of the conduit.

6. The parking cable of claim 4, wherein when the cap casings are assembled, a locking end formed at an outer end portion of each of the second split type liners is fixed by receiving a force for pressing the cap casings by swaging and a compressing force of a seal present in the cap casings.

7. A method of manufacturing a parking cable for a vehicle, the method comprising the steps of:

i) manufacturing a conduit having a predetermined diameter by winding a metallic wire in a cylindrical shape;

ii) coating an outer diameter of the conduit with a protective outer coating layer;

iii) cutting the conduit, which has been coated with the protective outer coating layer, to a desired predetermined length;

iv) press-fitting a plurality of split type liners into an inner diameter portion of the conduit at the inner diameter of the conduit that deviate from an in-line assembly section and a curved section in an entire length section of the conduit; and v) assembling cap casings for connecting the parking cable to an operating unit and a brake system to outer diameter portions at both end portions of the conduit.

8. The method of claim 7, wherein in the step of press-fitting the plurality of split type liners, the plurality of split type liners includes one or more first split type liners and second split type liners, and wherein the plurality of split type liners is press-fitted and disposed at positions that deviate from the in-line assembly section and the curved section in the entire length section of the conduit, and wherein the second split type liners are press-fitted into the both end portions of the conduit after the one or more first split type liners of the plurality of split type liners are press-fitted into the inner diameter portion of the conduit.

9. The method of claim 8, wherein in the step of press fitting, when the first split type liners are press-fitted into the inner diameter portion of the conduit, a protrusion formed on an outer diameter portion of the first split type liners is locked by coming into contact with an inner diameter surface of the conduit.

10. The method of claim 8, wherein in the step of press fitting, when the second split type liners are press-fitted into the both end portions of the conduit, a locking end formed on an outer end portion of each of the second split type liners is locked by coming into contact with an outer surface of the conduit.

11. The method of claim 7, wherein, in the step of assembling, when the cap casings are assembled, for connecting the parking cable to the operating unit and the brake system, a locking end formed on an outer end portion of each of the second split type liners is fixed by receiving a force for pressing the cap casings by swaging and a compressing force of a seal present in the cap casings.

12. The method of claim 7, wherein, in the assembling step, the cap casings for connecting the parking cable to the operating unit and the brake system are swaged to outer diameter portions at the both end portions of the conduit.

* * * * *